Patented July 3, 1934

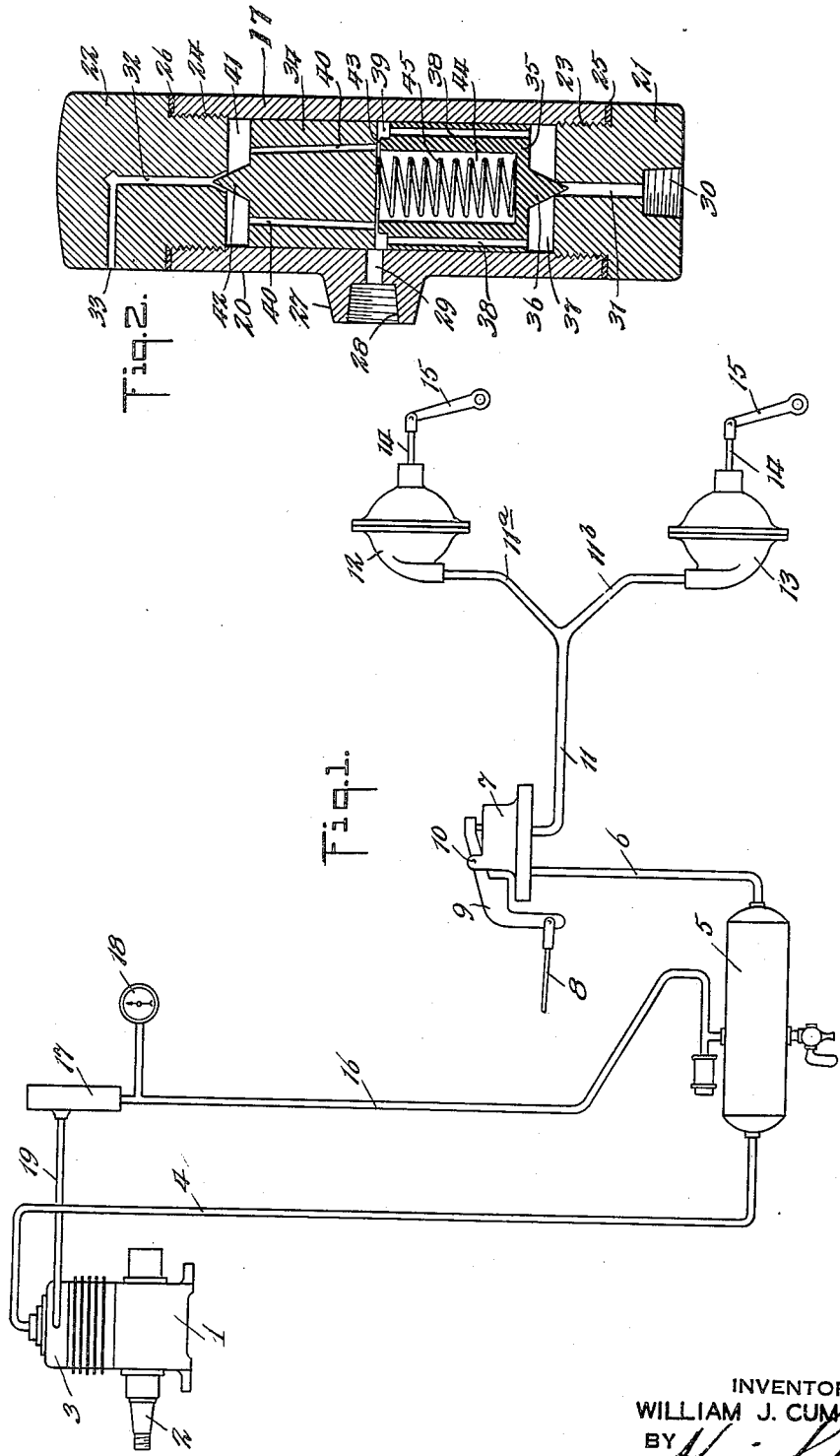

1,965,070

UNITED STATES PATENT OFFICE 1,965,070

AIR COMPRESSOR GOVERNOR

William J. Cumming, White Plains, N. Y.

Application January 19, 1932, Serial No. 587,457

11 Claims. (Cl. 137—153)

This invention relates more especially to governors for the unloading heads of continuously driven air compressors such, for example, as those employed in automotive braking equipments and has for its purpose to provide an improved construction for devices of this nature. More particularly my invention contemplates an improved construction and arrangement of interrelated parts which operate in a positive manner to render the governor sensitive in its response to small changes in pressure within an air reservoir connected to and supplied by the compressor which is controlled thereby for the purpose of maintaining the reservoir pressure within certain well-defined limits.

One of the objects of my invention is to provide an improved construction, combination and arrangement of parts for connecting the diaphragm chamber of an air compressor unloading head with the air reservoir and the outside atmosphere in alternation under the automatic control of the varying pressure in the air reservoir.

The accompanying drawing shows a preferred embodiment of my invention and more especially an adaptation thereof to an air-brake system for automobiles or the like in which the air-compressor may be driven continuously by the motor when the car is running.

In the drawing,

Figure 1 is a diagrammatic plan of an air-brake system for automobiles;

Figure 2 is an enlarged axial section of the air-compressor governor shown therein.

In air-brake systems for motor-driven vehicles, it is customary to connect up an air-storage reservoir with an air-compressor which is continuously driven while the motor is running and to provide said air-compressor with an unloading head which operates under the control of a governor which is itself responsive to the air pressure in the reservoir. According to usual constructions for devices of this character, each cylinder is provided with an unloading valve and the seats of said unloading valves are connected together by a passage in the unloading head so that whenever said unloading valves are displaced from their respective seats, the compression cylinders are placed in open communication with each other in such a way as to interrupt the compression of air and thus to temporarily reduce the load on the engine. By the provision of suitable diaphragm-operated levers in the unloading head and the interconnection of a governor of suitable design between the diaphragm chamber in the unloading head and the air reservoir, it is customary to cause the unloading valves to be moved from their seats under a predetermined maximum pressure of air in the reservoir and to be returned to their seats when a predetermined minimum pressure has been reached in said reservoir. The present invention contemplates an improved construction for governors used for this purpose.

The present invention contemplates in its preferred embodiment an air-compressor 1 provided with a driven shaft 2 which is operated continuously by the engine of a motor car while the motor is running. Surmounting the cylinders of the compressor 1 is an unloading head 3 which supplies compressed air through a pipe 4 to a reservoir 5. Leading from the reservoir 5 is a service pipe 6 which is connected up to an air application valve housing 7. A connection rod 8 which may extend to the foot pedal within a chauffeur's cab on the motor car is connected to a bent lever 9 pivoted at 10 for operating the air application valve. Leading from the housing 7 is a pipe 11 provided with branches 11a and 11b, said branches being connected respectively to the diaphragm housings or air-brake chambers 12 and 13. The diaphragms (not shown) within the housings 12 are connected by rods 14 to brake-operating lever arms 15. A pipe connection 16 which extends upwardly from the reservoir 5 is connected at its upper end to a governor housing 17, an air pressure gauge 18 being connected to the pipe connection 16 for indicating the pressure of the air therein. A second pipe connection 19 is arranged between the governor housing 17 and the diaphragm chamber within the unloading head 3.

Referring now to Figure 2 of the drawing, the preferred embodiment of my improved governor comprises a central cylindrical body 20, a lower plug cap 21 and an upper plug cap 22. Said plug caps are threaded at 23 and 24 respectively into the interiorly threaded lower and upper ends of the tubular body 20, lower and upper gaskets 25 and 26 being interposed between the opposite ends of the body 20 and annular shoulders of the plug caps 21 and 22. Said tubular body 20 is provided intermediately of its ends with a hollow boss 27 which is threaded interiorly at 28 to receive one end of the pipe connection 19 which is thus connected to a cylindrical chamber within the tubular body 20 by means of a port or opening 29. The lower cap plug 21 is provided with a threaded socket 30 into which screws the upper end of the connection pipe 16. Leading from the threaded socket 30 to the interior of the tubular body 20 is a port opening 31 of predetermined cross-section related to the desired maximum and minimum pressures of the air in reservoir 5 at which the unloading valves are to be opened and closed. The upper plug cap 22 is likewise provided with a port 32 of predetermined size, said port opening through a laterally-discharging branch 33 to the outer atmosphere. Reciprocably mounted within the cylindrical chamber formed within the governor housing, are upper and lower valve pistons 34 and 35. The lower valve piston 35 is provided with a conical tip or needle valve 36 which is adapted to close the upper end of port opening 31, an inlet chamber 37 being formed between the bottom end of said lower valve piston and the inner wall of the plug cap 21. Extending longitudinally through the lower valve piston 35 are air passages 38 which serve to maintain open communication between the inlet chamber 37 and an annular chamber 39 formed between the upper and lower valve pistons. This annular chamber 39 is provided with uninterrupted communication with the diaphragm chamber in the unloading head 3 through the port opening 29 and connection pipe 19. The upper valve piston 34 is provided with air passages 40 which extend longitudinally therethrough and open at their upper ends into an outlet chamber 41 which is open to the outer atmosphere through the port openings 32 and 33 whenever the upper valve piston 34 is in its lower position. Said upper valve piston 34 is provided with a conical tip or needle valve 42 which is adapted in the raised position of said valve piston to close the outlet port 32. The lower valve piston 35 is provided at its upper end with an annular flange 43 which is adapted to be moved into position to close the lower ends of the air passages 40 whenever said lower valve piston is raised. Mounted within a central well or depression 44 of the lower piston valve is a compression spring 45 suitably designed to maintain a slight separation between the upper valve piston 34 and the annular flange 43 on the upper end of lower valve piston 35. The operation of my improved governor will now be readily understood and briefly recited is as follows.

Whenever the pressure within the air storage reservoir 5 drops below a predetermined minimum, the lower valve piston 35 drops under its own weight and closes the inlet port opening 31. The upper valve piston 34 likewise falls and opens the bleeder port 32 to the outer atmosphere. Under these conditions, the interposed spring 45 is adapted to provide an opening around the lower ends of the air passages 40 in the upper valve piston 34 so that a free passage is opened from the diaphragm chamber in the unloading head 3 of the air compressor through pipe 19, port 29, annular chamber 39, air passages 40, upper chamber 41 and bleeder port 32. The release of pressure on the under side of the diaphragm in unloading head 3 permits the closing of the unloading valves within said head and thus adapts the air compressor to function so that compressed air is supplied to the reservoir 5 through the connection pipe 4. As the pressure of the air in reservoir 5 rises, it eventually reaches a predetermined maximum at which the conical valve 36 is lifted from the upper end of inlet port 31, the upper valve piston 34 being displaced by the upward movement of lower valve piston 35 and inasmuch as a free passageway is thus created through inlet port opening 31, chamber 37, air passages 38, port 29, and pipe 19, to the under side of the diaphragm chamber in unloading head 3, the unloading valves are again opened and the air permitted to pass to and fro between the cylinders of the compressor 1.

I claim:—

1. In a pressure regulating valve, the combination with a valve housing arranged on a vertical axis and provided with a lower compressed air inlet port, an upper exhaust port and an intermediate port through which compressed air is supplied to and discharged from a pressure fluid responsive device, of a lower valve piston for controlling the passage of compressed air between said inlet port and said intermediate port, and an upper valve piston provided with a longitudinal passage controlled by the lower piston valve for controlling the discharge of compressed air from said intermediate port through said exhaust port.

2. A pressure regulating valve of the character claimed in claim 1, in which said valve pistons are provided with conical valve tips for providing inlet and exhaust chambers between the respective valve pistons and the end walls of the valve housing and in which said valve pistons are provided with longitudinal passages extending from said inlet and exhaust chambers to the space between said valve pistons.

3. A pressure regulating valve of the character claimed in claim 1, in which said lower piston valve is provided with a circular flange inset from the outer edge of the valve piston to provide an annular chamber communicating with said intermediate port of the valve housing and constructed to close the inner end of said longitudinal passage in the upper valve piston, the inner end of said longitudinal passage in the upper piston being suitably arranged for this purpose.

4. In a valve, the combination with a valve housing provided at opposite ends with restricted ports leading respectively to a source of compressed air and to the outer atmosphere and with an opening intermediately arranged with respect to its ends for connection to a pressure-fluid chamber, relatively movable pistons in said valve housing for respectively controlling said restricted ports, each of said pistons being provided with longitudinal passages extending therethrough, and a compression spring interposed between said pistons and normally holding said pistons apart, said intermediate opening in the housing being in communication with the space between said pistons.

5. In a pressure regulating valve, the combination with a valve housing provided with axially-spaced coaxially-arranged restricted ports leading respectively to an air reservoir and to the outer atmosphere, relatively movable pistons in said housing, said pistons being provided with longitudinal passages extending therethrough and with valves for said restricted ports, the valve-carrying piston for the air reservoir port being adapted to close the adjacent ends of said longitudinal passages of the valve-carrying piston for the atmosphere port, and a compression spring interposed between said pistons and normally holding them apart, said housing being provided with an opening in communication with the longitudinal passages through both pistons in their separated positions whereby compressed air may be alternately supplied to and exhausted from a compressed air actuated device.

6. In a pressure regulating valve, the combination of a vertically arranged cylindrical housing provided with a pressure fluid port at its lower end and a port to the outer atmosphere at its upper end, a lower piston valve for controlling the pressure fluid port of said housing, an upper piston valve for controlling said port to the outer atmosphere, said upper piston valve being provided with longitudinally arranged ports extending from top to bottom thereof, a compression spring interposed between said piston valves and normally sustaining said upper piston valve in raised position with respect to said lower piston valve, said lower piston valve being provided with a raised annular flange adapted to close the lower ends of said longitudinal ports in the upper piston valve and with longitudinal passages connecting the annular space extending around said annular flange to the space below said lower piston valve, and a pipe connection extending from the annular space in said housing between said piston valves.

7. In a pressure regulating valve, the combination with a valve housing arranged on a vertical axis and provided with coaxially arranged compressed air inlet and exhaust ports at opposite ends of said valve housing, of a lower valve piston for controlling said compressed air inlet port, an upper valve piston actuated by said lower valve piston for controlling said exhaust port, said valve pistons being provided with passages extending therethrough, and a compression spring interposed between said valve pistons for supporting the upper valve piston above the lower valve piston, said valve housing being provided with an intermediate port-opening in open communication with the space between said valve pistons whereby compressed air may be supplied to and discharged from a fluid pressure responsive device past said valve pistons.

8. In a valve of the character described, the combination of a housing provided at one end with an inlet port for compressed air and at its other end with an exhaust port, a piston valve for controlling said exhaust port, said piston valve being provided with longitudinal passages extending therethrough, another piston valve for controlling said inlet port, the last-mentioned piston valve being adapted to close the adjacent ends of said longitudinal passages in the first-mentioned piston valve and having longitudinal passages extending therethrough, a compression spring interposed between and normally holding said piston valves in axially spaced relation, said housing being provided with an opening in permanent communication with the longitudinal passages in the second-mentioned piston valve and intermittently in open communication with the longitudinal passages in the first-mentioned piston valve whereby compressed air may be alternately supplied to and exhausted from a fluid pressure responsive device through said piston valves.

9. In a pressure regulating valve, the combination of a vertically arranged housing provided with a centrally disposed opening through which compressed air may be alternately supplied to and exhausted from a fluid pressure responsive device, and with axially spaced compressed air inlet and exhaust ports arranged respectively below and above said centrally disposed opening, an upper piston valve for controlling said exhaust port, said upper piston valve being provided with longitudinal passages extending therethrough, a lower piston valve for controlling said inlet port, and said longitudinal passages in the upper piston valve, said lower piston valve being provided with longitudinal passages extending therethrough and in open communication with said centrally disposed opening in the valve housing, and a compression spring interposed between said piston valves and normally sustaining said upper piston valve in axially spaced relation to said lower piston valve.

10. In a valve of the character described, the combination of a vertically arranged housing provided at its lower end with an inlet port for compressed air and at its upper end with an exhaust port, an upper piston valve for controlling said exhaust port, said upper piston valve being provided with longitudinal passages extending therethrough, and a lower piston valve for controlling said inlet port and said longitudinal passages in the upper piston valve, said upper piston valve being provided with longitudinal passages extending therethrough, said housing being provided with a pipe connection opening into said housing between said piston valves through which compressed air may be alternately supplied to and exhausted from a fluid pressure responsive device through said piston valves.

11. In a pressure regulating valve, the combination of a vertically arranged housing provided at its lower end with an inlet port for compressed air and at its upper end with an exhaust port, an upper piston valve provided with a conical tip for controlling said exhaust port and providing an outlet chamber between said upper piston valve and the upper end wall of said housing, said upper piston valve being provided with longitudinal passages extending therethrough, a lower piston valve provided with a conical tip for controlling said inlet port and providing an inlet chamber between said lower piston valve and the lower end wall of said housing, said lower piston valve being provided with a raised annular flange adapted to close the lower ends of said longitudinal passages in the upper piston valve and with an annular recess extending around said annular flange, means normally sustaining said upper piston valve in axially spaced relation to said lower piston valve, and a pipe connection in permanent communication with said annular recess through which compressed air may be alternately supplied to and exhausted from a fluid pressure responsive device through said piston valves, said lower piston valve being provided with longitudinal passages extending therethrough from the annular recess to said inlet chamber.

WILLIAM J. CUMMING.